Jan. 26, 1965 J. M. MALEK 3,167,488
SOLAR EVAPORATOR
Filed Aug. 4, 1960
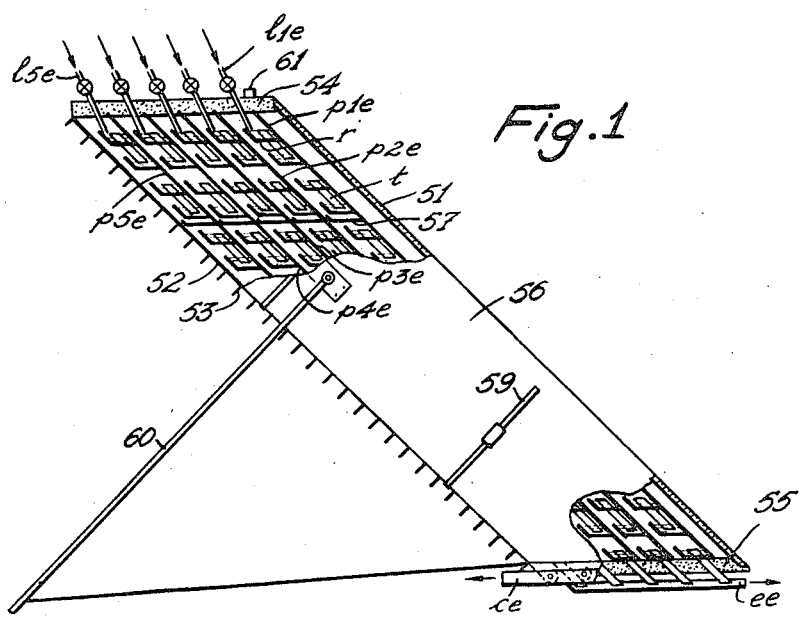
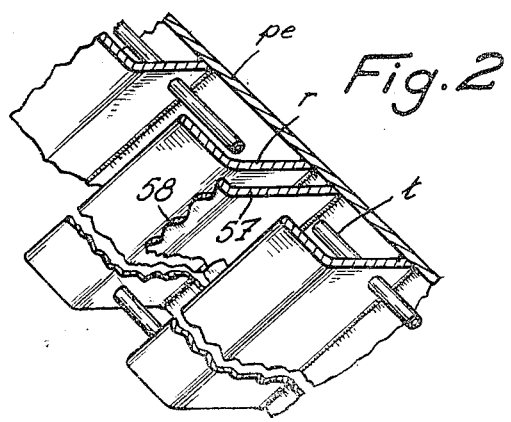

United States Patent Office 3,167,488
Patented Jan. 26, 1965

3,167,488
SOLAR EVAPORATOR
Jan Michal Malek, 15 Allee Brimborion,
Bellevue-Meudon, Seine-et-Oise, France
Filed Aug. 4, 1960, Ser. No. 47,513
Claims priority, application France, Nov. 12, 1959, 809,949; Feb. 22, 1960, 819,161; May 3, 1960, 826,100
2 Claims. (Cl. 202—174)

The present invention relates to apparatus for obtaining heat and vapor transfers. More particularly, the invention is related to solar evaporators.

Known solar single-effect evaporators have an efficiency which is relatively low with respect to their dimensions and therefore are not economical.

It is a principal object of the invention to provide improved solar evaporators which are economical and provide efficient solar distillation by evaporation at temperatures below the boiling point, at the ambient pressure, of the liquid to be distilled, by utilizing the principle of the multi-effect method for transferring heat and vapor.

The condensation heat of the vapor obtained by distillation of a mass of liquid is utilized to effect distillation, by evaporation, of a fresh mass of liquid at temperatures below its boiling point at the ambient pressure by the diffusion of the fresh vapor through the ambient gas and the condensation of the fresh diffused vapor onto a cold wettable wall down which the fresh condensate under turbulent conditions under the action of gravity.

It is a further object of the invention to provide in a solar evaporator, heat exchange walls adapted for the heating of a mass of liquid to be distilled and which is placed in the form of a thin layer on one face of each wall, by the vapor emanating from another mass of liquid condensing on the opposite, wettable, faces of those same walls and running down the wettable faces of the wall under the action of gravity.

The description which follows with reference to the accompanying drawings is given by way of example only and not in a limiting sense, and will give a clear understanding of how the invention may be performed.

In the drawings: FIGURE 1 is a diagrammatic side view partially broken away of a solar evaporator in accordance with the invention.

FIG. 2 is a partial perspective view of a portion of a wall of the apparatus in FIG. 1.

The evaporator shown in FIGS. 1 and 2 operates by solar energy. The evaporator comprises a chamber consisting of an upward-facing wall 51 made of a material which is transparent to sunrays, such as glass or plastic material, a heat-conducting wall 52 which is provided with cooling fins 53 and which is parallel to the wall 51, and top and bottom walls 54 and 55 respectively, as well as two side walls 56 made of insulating material only one of which is visible in FIG. 1. The upward-facing wall 51 is blackened in order to absorb solar heat. Inside said chamber are parallel heat transfer walls $p1e$ through $p5e$ which form an angle with respect to the horizontal and which carry a succession of drains $r$, constituted, for example, by folds in the respective plate. Overflow gutters or tubes $t$ connect each drain with the drain below in order to provide a turbulent flow of fluid from one drain to the next. The gutters $t$ are arranged at alternating ends of successive drains. The walls $pe$ are supplied with the liquid to be treated through passageways $l1e$ through $l5e$, the waste liquid being collected at the bottom by a conduit $ee$. The condensate which forms on the wettable plane faces of walls $p2e$ through $p5e$ and 52 is collected at the bottom of these walls by gutters which empty into a main condensate conduit $ce$.

The condensation faces of each wall are arranged as close as possible to the edges of the drains carried by the adjacent wall, yet without permitting communication between the thin layer of condensate and the liquid to be evaporated which is contained in those drains. The necessary minimum distance is established by means of longitudinal sections 57 for each wall, the edge of each such section which bears against the condensation face of the adjacent wall being provided with serrations 58 to facilitate the total draining of the condensate. The walls are drawn against each other, through the medium of these spacer sections 57, by means of bands 59 which girdle the evaporator apparatus at its top and bottom respectively. The walls $p1e$–$p5e$ are preferably located in grooves provided in the top and bottom walls 54 and 55 and in the sides 56. The apparatus is fitted with a support 60 of adjustable inclination to enable the wall drains to be positioned horizontally. To this end, the distilling apparatus is preferably equipped with a bubble-level 61. The heat transfer walls are preferably inclined at 45° with respect to the horizontal.

In operation: the liquid to be treated is introduced through passageways $l1e$–$l5e$ and the liquid flows in the form of a thin layer down the drains throught the gutters on the tiered arrangement of heat transfer walls $P1e$–$P5e$. The solar heat which is absorbed in the evaporator through the wall 51, causes heating of a gaseous medium which is contained in the evaporator which in turn causes heating and evaporation of the liquid to be treated. The evaporated liquid diffuses in the passages between adjacent walls and contacts the smooth upper faces of the walls $P2e$–$P5e$ and wall 51 which are cooled by the introduced liquid. Condensate is formed on the upper faces of the walls and flows downwardly and is collected in conduit $Ce$. Waste liquid is collected in conduit $ee$.

The arrangement described above provides a multiple-effect heat and vapor transfer which is applicable to a number of purposes such as to distill water and in particular sea-water or spring waters, to separate liquids forming solutions, to separate mixtures and even to separate azeotropic mixtures. Indeed, in the case of the latter, the azeotropic point varies for different distillation temperatures and different partial vapor pressures. Thus liquids which constitute azeotropic when boiled mixtures may no longer be azeotropic at lower temperatures, so that separation can be effected.

What I claim is:

1. In an apparatus for multiple-effect heat and vapor transfer usable for the distillation and the concentration of liquids and for the drying of various materials, and of the type comprising a container which contains a gaseous fluid under a given pressure and a tiered arrangement of stationary parallel angular heat transfer walls having the same relatively large area and one face of which is wettable, said heat transfer walls being disposed with their wettable faces upwardly directed while on at least one portion of their other faces the liquid to be treated is supplied in the form of a relatively thin layer, means to heat the uppermost heat transfer wall to a temperature below the boiling temperature of the liquid layer carried by said uppermost wall at said given pressure as well as to cool the lowermost heat transfer wall of said arrangement, whereby is defined in said container a tiered arrangement of separate elongated simultaneous evaporating and condensing compartments each of which is limited by two successive heat transfer walls, the facing wettable face and other face of which respectively act as a condensing surface and an evaporating surface, and means for respectively collecting from said compartments condensates draining down by gravity from their condensing surfaces; the improvement according to which each heat transfer wall is provided, on its other face carrying the liquid to be evaporated, with at least one series of substantially horizontal superposed drains inside which the liquid is placed in a thin layer, overflow tubes connecting each drain to the drain below for each series and being arranged at alternating ends of successive drains, passageways conducting the liquid to be treated to the top drain of each series, the waste liquid being collected in the bottom drain of each series, and a gutter being arranged at the lowermost portion of the wettable face of said wall to collect the condensate obtained in the compartment for which said wettable face acts as a condensing surface.

2. An apparatus according to claim 1, wherein the heat transfer walls are arranged substantially inclined at an angle of forty-five degrees, and wherein the container comprises, above the uppermost heat transfer wall, a blackened wall made of material transparent to sun-rays and parallel to said uppermost heat transfer wall, under the lowermost heat transfer wall, a heat-conducting wall provided with cooling fins and parallel to said lowermost heat transfer wall, a top wall, a bottom wall and two side walls, which top, bottom and side walls are made of insulating material, whereby said apparatus operates by solar energy.

References Cited in the file of this patent

UNITED STATES PATENTS

| | | |
|---|---|---|
| 614,776 | Stocker | Nov. 22, 1898 |
| 1,249,480 | Pflugfelder | Dec. 11, 1917 |
| 2,041,059 | French | May 19, 1936 |
| 2,197,539 | Hickman | Aug. 16, 1940 |
| 2,298,377 | Hickman | Oct. 13, 1942 |
| 2,313,546 | Hickman | Mar. 9, 1943 |
| 2,446,997 | Brewer et al. | Aug. 17, 1948 |
| 2,486,684 | Schlesman et al. | Nov. 1, 1949 |
| 2,525,025 | Feil | Oct. 10, 1950 |
| 2,894,879 | Hickman | July 14, 1959 |

FOREIGN PATENTS

| | | |
|---|---|---|
| 713,759 | Great Britain | Aug. 18, 1954 |